H. H. CRAIGIE.

Water-Closet.

No. 5,066. Reissued Sep. 24, 1872.

Witnesses.

Chas. F. Smith

Geo. D. Walker

Inventor

Hugh H. Craigie

Lemuel W. Serrell atty.

AM. PHOTO-LITHOGRAPHIC CO. N.Y. (OSBORNE'S PROCESS.)

UNITED STATES PATENT OFFICE.

HUGH H. CRAIGIE, OF NEW YORK, N. Y.

IMPROVEMENT IN WATER-CLOSETS.

Specification forming part of Letters Patent No. 76,403, dated April 7, 1868; antedated April 1, 1868; reissue No. 5,066, dated September 24, 1872.

*To all whom it may concern:*

Be it known that I, HUGH H. CRAIGIE, of the city and State of New York, have invented, made, and applied to use a certain new and useful Improvement in Water-Closets; and I do hereby declare the following to be a full, clear, and exact description of the same.

The ordinary pan water-closet is not cleanly; the pan, as it drops down, causes the contents to be spilled out on the sides of the hopper; besides this, the pans themselves very speedily become destroyed or difficult to keep clean. I make use of a vitrified pan that is the section of a globe, or nearly so, and swings on centers at its sides, in order that the section may draw away from below the contents of the closet, allowing the same to fall vertically into the soil-pipe.

Figure 1:
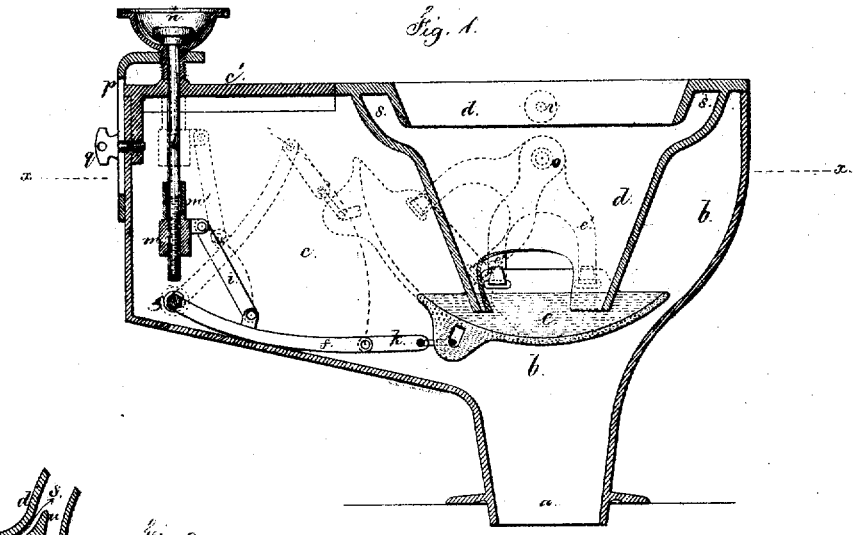
Figure 3:
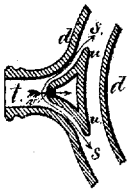
Figure 2:
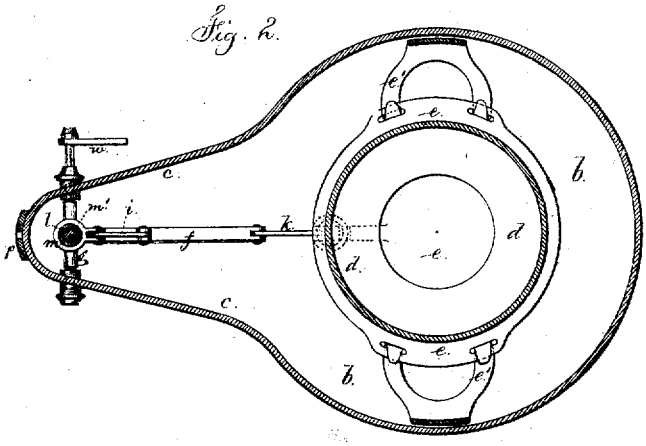

In the drawing, Figure 1 is a vertical section of my improved water-closet; Fig. 2 is a sectional plan of the same at the line *x x;* and Fig. 3 is a sectional plan of the horn and water-way.

*a* is the soil-pipe; *b*, a hopper of metal extending up in about the form shown, and having a hollow arm, *c*, passing off to one side. *d* is the basin, of china or similar material, supported by a flange at its upper edge resting on top of the hopper. *e* is a vitrified pan, formed as a concave, the section of a globe, or nearly so, and hung by straps *e'*, attached by centers *o* at the sides of the hopper *b*, so that the pan *e* can be swung aside on the line, or nearly so, of its own curvature, and thereby draw directly from under the contents and allow the same to drop into the soil-pipe *a*, and when in place the pan retains sufficient water to trap the lower end of the closet-basin. In order to move the pan *e* I employ a lever, *f*, hinged at *g*, and connected by the link *k* to the under side of the pan *é*. *l* is the pull of the closet, passing down and united by the link *i* to the lever *f*. The dotted lines show the position of the parts when the pan is drawn aside. I prefer that the link *i* be connected at its upper end to the nut *m* on the pull *l*, so that by turning the pull the parts may be adjusted, and a set-nut, *m'*, or sleeve on the rod *l*, determines the height to which the pull may be drawn, said nut or sleeve taking against the under side of the cover *c'* of the hollow arm *c*. In order to sustain the socket *n* of the pull *l*, I make use of an adjustable bracket, *p*, secured to the side of the hollow arm *c* by the screw *q*, so that the pull may be kept in its proper position relatively to the other parts of the closet; but it can be raised or lowered to accommodate the thickness of the seat or wood-work of the closet. The screw *q* also secures the cover *c'* to the hollow arm *c*. I form the upper part of the basin *d* as an annular water-way, *s*, opening downwardly, so as to wash the interior surface of the basin, and I supply the water through a horn or pipe, *t*, on one side of this water-way, (see sectional plan, Fig. 3,) and I introduce thereinto the triangular deflector *u*, that causes the water to pass off both ways through the said water-way *s*, and I provide a hole or opening at *v* to allow sufficient water to pass through this deflector to wash the interior of the basin below the point where it is introduced. The valve or cock that supplies water to the closet may be of any desired character, and can be operated by an arm on the axis of the lever *f*, as extended at *w*. It will be evident that the pan *e* might be swung by an attachment to the slings that suspend the same at the point of their connection to the pan, in which case the hollow arm *c* from the hopper might be dispensed with. The metallic hopper *b*, extending up and inclosing the basin *d*, (which is of porcelain,) sustains the same by a flange. In consequence of the metal hopper *b* extending up to the flange of the porcelain basin, the joint between said basin and the hopper is made tight by one packing of cement; whereas in the pan-closets made before my invention the basin rested upon a plate at the upper end of the hopper, and there was a joint both above and below the said plate, and if the pan required repair this top plate had to be removed as well as the basin. In my closet the opening at the upper end of the hopper is large enough to allow the pan to be inserted or withdrawn when the basin is removed.

What I claim, and desire to secure by Letters Patent, is—

1. A pan formed as a section of a globe, or nearly so, and mounted so as to move nearly in the line of its own curvature, in combination with a water-closet basin.

2. Suspending the pan of a water-closet from two centers, one on each side of the hopper, and above the lower end of the basin, as set forth, so that said pan can swing up within the hopper as it passes from under the lower end of the basin.

3. The combination of a pan made and moving as specified with a water-closet basin and metallic hopper extending up around said basin, as and for the purposes set forth.

4. The annular water-way *s*, in combination with the deflector *u*, fitted in the manner and for the purposes set forth.

5. The slotted standard *p*, attached to the side of the hopper and adjustable vertically, in combination with the socket *n* of the pull, substantially as and for the purposes set forth.

6. A movable section forming a portion of the cover of the container adjacent to the flange of the basin, secured by flanges and a screw, substantially as specified.

7. The pan and its sustaining-axis introduced at one opening in the hopper or container, said axis passing through a hole in the metallic hopper or container, substantially as specified.

Signed by me this 13th day of April, 1872.

H. H. CRAIGIE.

Witnesses:
GEO. T. PINCKNEY,
CHAS. H. SMITH.